H. B. CLUXTON.
FENCE.

No. 170,055. Patented Nov. 16, 1875.

WITNESSES:
P. C. Dieterich.
W. C. McArthur.

INVENTOR:
Henry B. Cluxton.
per.
J. T. H. Alexander
ATTORNEY.

UNITED STATES PATENT OFFICE.

HENRY B. CLUXTON, OF RIPLEY, OHIO.

IMPROVEMENT IN FENCES.

Specification forming part of Letters Patent No. 170,055, dated November 16, 1875; application filed September 20, 1875.

*To all whom it may concern:*

Be it known that I, HENRY B. CLUXTON, of Ripley, in the county of Brown and State of Ohio, have invented certain new and useful Improvements in Farm-Fences; and I do hereby declare that the following is a full, clear, and exact description thereof, reference being had to the accompanying drawings, and to the letters of reference marked thereon, which form part of this specification.

The nature of my invention consists in the construction and arrangement of a farm-fence, as will be hereinafter more fully set forth.

In order to enable others skilled in the art to which my invention appertains to make and use the same, I will now proceed to describe its construction and operation, referring to the annexed drawing, in which—

Figure 1:
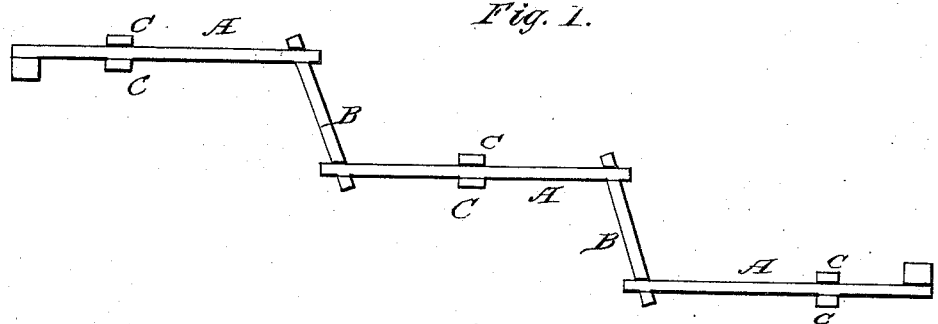
Figure 2:
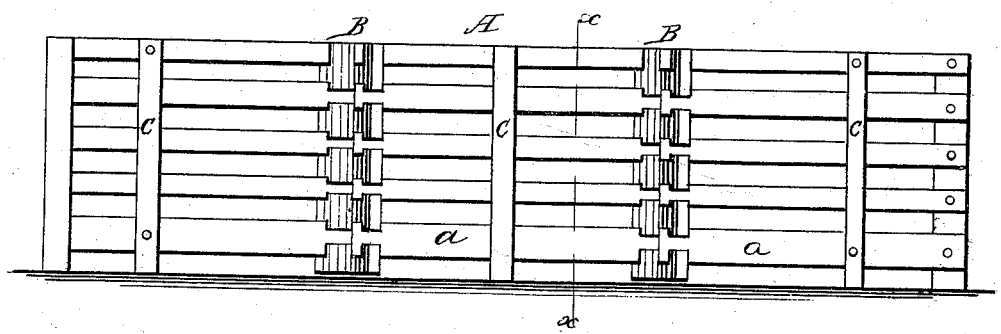
Figure 3:
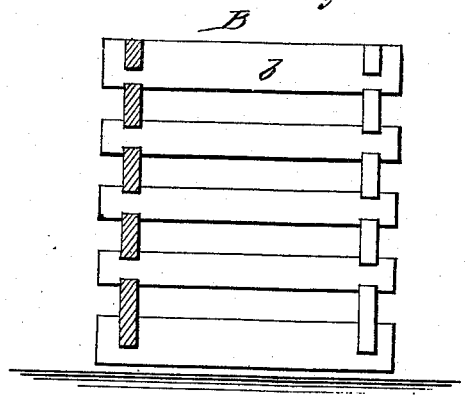

Figure 1 is a plan view, and Fig. 2 a side elevation, of my fence. Fig. 3 is a section through the line $x$ $x$, Fig. 2.

The fence is made of wood, of alternate long and short panels A and B. The long panels may be from eight to twelve feet in length, and the short panels about four feet. The bottom plank $a$ of each long panel A is ten inches wide, with a notch cut three inches deep on the under edge, and another notch one inch deep on the upper edge, and three inches from the ends. All the other planks are six inches wide, except the top plank $b$ of the short panel B, which is ten inches wide. This latter plank has a notch at each end, cut five inches deep on the top edge. By this means the top of the fence is made level. All the planks, except those referred to as $a$ and $b$, are notched one inch deep and three inches from the ends.

To set the fence up I commence with the short plank on the ground, then the long one, and continue to the end, giving about three feet worm to the fence, to prevent its blowing down.

On each side of the long panel is a vertical slat, C, fastened by bolts through the top and between planks, and one in the middle, holding the planks from warping. These vertical planks extend below the lower planks and to the ground, so as to be on a line with the bottoms of the short planks, and act as braces for the fence, and at the same time assist in supporting it.

Having thus fully described my invention, what I claim as new, and desire to secure by Letters Patent, is—

The combination, in a worm-fence, of the long and short panels, having the ends of their planks notched, as described, to interlock with each other, and braced and supported by the vertical slats C C, which extend to the ground, substantially as and for the purpose set forth.

In testimony that I claim the foregoing as my own I affix my signature in presence of two witnesses.

HENRY B. CLUXTON.

Witnesses:
F. F. SHAW,
F. G. SHAW, Jr.